(12) United States Patent
Doray

(10) Patent No.: US 7,980,353 B2
(45) Date of Patent: Jul. 19, 2011

(54) STEERING SYSTEM FOR CONTROLLING THE TURNING ANGLE OF THE STEERING WHEELS OF A VEHICLE

(75) Inventor: Jean-Baptiste Doray, Chasse sur Rhone (FR)

(73) Assignee: Renault Trucks, Saint Priest (FR)

( * ) Notice: Subject to any disclaimer, the term of this patent is extended or adjusted under 35 U.S.C. 154(b) by 272 days.

(21) Appl. No.: 12/442,639

(22) PCT Filed: Oct. 23, 2006

(86) PCT No.: PCT/FR2006/051089
§ 371 (c)(1),
(2), (4) Date: Mar. 24, 2009

(87) PCT Pub. No.: WO2008/049979
PCT Pub. Date: May 2, 2008

(65) Prior Publication Data
US 2010/0006366 A1    Jan. 14, 2010

(51) Int. Cl.
*B62D 5/09* (2006.01)
(52) U.S. Cl. .......................... 180/403; 180/406; 180/422
(58) Field of Classification Search .................. 180/403, 180/406, 417, 421, 422; 70/41, 42
See application file for complete search history.

(56) References Cited

U.S. PATENT DOCUMENTS

| 6,279,675 B1 * | 8/2001 | Bohner et al. ................ 180/403 |
| 6,336,519 B1 * | 1/2002 | Bohner et al. ................ 180/403 |
| 6,612,393 B2 * | 9/2003 | Bohner et al. ................ 180/405 |

FOREIGN PATENT DOCUMENTS

| DE | 10255066 A1 | 6/2004 |
| WO | 2004009425 A | 1/2004 |

OTHER PUBLICATIONS

International Search Report for corresponding International Application PCT/FR2006/051089.

* cited by examiner

Primary Examiner — Kevin Hurley
(74) Attorney, Agent, or Firm — WRB-IP LLP

(57) ABSTRACT

A steering system is provided for controlling the turning angle of the steering wheels of a vehicle. The steering system includes two electro-hydraulic circuits each including an actuator, both actuators being mechanically coupled and acting simultaneously on the turning angle of the wheels. A first circuit is displacement-controlled relative to a position set point while a second circuit is stress controlled. The set point applied of the second circuit includes a component developed from the filtering of the position set point applied to the first circuit.

12 Claims, 3 Drawing Sheets

STEERING SYSTEM FOR CONTROLLING THE TURNING ANGLE OF THE STEERING WHEELS OF A VEHICLE

BACKGROUND AND SUMMARY

The invention relates to the field of steering control systems fitted to motor vehicles, and particularly industrial vehicles, such as trucks. It relates more specifically to steering systems in which the turning of the wheels is not obtained by a mechanical transmission but by means of devices transmitting electrically or even hydraulically the instructions given by the driver. These steering systems are known under the general name of "Steer by Wire". It is desirable to provide an enhancement of the command and control method of certain types of "Steer by Wire" device.

Usually, steering systems of the "Steer by Wire" type are more particularly designed taking account of the concerns relating to reliability, since the steering is a safety function, and these systems use many electronic components carrying out numerous complex computations.

Therefore, it has already been proposed to duplicate the electrohydraulic circuits and the associated control, for the purpose of redundancy, and in order to supplant one circuit by the other when one of them becomes faulty. Therefore, document WO 2004/009425 describes a steering control system which comprises two electrohydraulic circuits operating simultaneously. Each of these circuits includes an actuator acting on the turning angle of the wheels. The two actuators are mechanically coupled so that, if one of the electrohydraulic circuits (or the associated command?) fails, the other circuit takes over.

Because the two actuators are mechanically coupled, it is necessary to use different control strategies. Therefore, a first actuator is displacement-controlled, while the second is stress-controlled. Therefore, when the circuits are designed in a similar manner, each supplies substantially half of the power necessary to turn the wheels. However, instability phenomena may manifest themselves when the controls of the two circuits are not exactly synchronized, in particular because of different reaction time and inertia of one circuit versus the other.

Therefore, in the particular case in which the hydraulic circuit includes "closed-center" solenoid valves, particular difficulties may arise.

Specifically, closed-center valves are such that, at rest, they do not allow a fluid to pass through to the actuator. Therefore, because the actuators are mechanically coupled, the beginning of the opening of a solenoid valve does not allow a fluid to pass if the complementary solenoid valve of the other circuit is not also in the same state of opening.

In other words, if one solenoid valve begins to open while the other still remains closed for a fraction of a second, the fluid cannot flow and everything happens as if the solenoid valve that is already open had remained closed. It is conceivable therefore that these actuation differences may cause steering difficulties, or even instabilities that are prejudicial to correct operation of the system. FIG. 4a depicts a timing chart showing on a standard scale the change over time of the turning angle of the wheels, represented by the curve 141, in response to an instruction corresponding to a rotation of the steering wheel, represented by the curve 142. FIG. 4b illustrates, on a standard scale, the displacement of the solenoid valve slides of the valves of the two differently-controlled circuits. For the displacement-controlled circuit (curve 143), note that the amplitude of displacement of the solenoid valve slide is slightly ahead, and of greater amplitude than the displacement (curve 144) of the solenoid valve slide of the stress-controlled circuit. FIG. 4c illustrates the stress values evaluated for each circuit. Note that, surprisingly, at the beginning of the response, the stress (curve 146) applied in the stress-controlled circuit is not equal, but opposite to the stress (curve 147) exerted in the displacement-controlled circuit. In other words, because of the imperfections of this control method, the stress-controlled circuit that is supposed to assist the displacement-controlled circuit does not fulfill this function, but on the contrary sustains a stress from the position-controlled circuit until a nominal operation is achieved. The result of this is an additional consumption of power that is not converted into kinetic energy.

A difference in the command instructions of the two solenoid valves is virtually inevitable because the two controls operate on variables of different kinds, measured by sensors of a different type.

Specifically, the displacement-controlled circuit uses a distance sensor, measuring the travel made by the actuator. Conversely, the stress-controlled circuit uses several pressure sensors, mounted on the various chambers of the two actuators. The pressure sensors being of a different design from the displacement sensors, it can be seen that they generate a difference of reaction time of the two control circuits.

The invention therefore relates to a steering system controlling the turning angle of the steering wheels of a vehicle. In a known manner, such a system comprises two electrohydraulic circuits each including an actuator. The two actuators are mechanically coupled and act simultaneously on the turning angle of the wheels. A first of the two circuits is movement-controlled relative to a position instruction, while the second circuit is stress-controlled.

According to the invention, this system is characterized in that the instruction applied to the second circuit comprises a component developed from a filtering of the position instruction applied to the first circuit.

In other words, the circuit that is stress-controlled also reacts to the position command, for transitional phases, making it possible to prevent locking phenomena.

The operation of the second circuit is therefore not simply the result of a stress control, but takes account partially of the displacement command which acts on the other circuit. Therefore, since the stress control is usually slower than the displacement control, the addition of this additional characteristic component makes it possible to anticipate the movements of its solenoid valves, relative to a configuration of the prior art, and notably that described in document WO 2004/09425.

In practice, the characteristic component developed from the filtering of the position instruction may include a filtering of the high-pass type. In other words, the injection of this characteristic component makes it possible to cause the stress-control to react rapidly to the changes of the displacement instruction. In other words, the invention therefore allows the stress-controlled circuit to see its solenoid valves move virtually as quickly as those of the displacement-controlled circuit.

Advantageously in practice, the stress-control of the second circuit may include a low-pass filtering of the stress measurement made on the actuator or actuators, so as to decouple in frequency the influence of the characteristic additional component of the main stress-control component. In other words, for rapid turning movements, the stress-controlled circuit reacts mainly thanks to the additional component based on the position instruction.

Conversely, in a low-frequency band, for virtually static movements, the mainly stress-controlled circuit is no longer sensitive to the position command, but to its main loop interfaced with the pressure sensor.

Such a control architecture makes it possible to compensate for the harmful time-lags mentioned for the circuits using closed-center valves. However, it may also have a response-enhancement value for circuits using open-center valves.

Advantageously in practice, each electrohydraulic circuit may be controlled by a command and control unit that is specific thereto, for the purpose of redundancy and of increasing reliability.

Advantageously in practice, the position instruction may be developed from a steering control member on which the driver takes action.

In practice, the system may comprise at least one sensor measuring the displacement of one or other of the actuators, and several sensors measuring the pressures prevailing in the chambers of the actuators.

According to a first embodiment, the position instruction may be transmitted to the electronic command and control units each assigned to an electrohydraulic circuit. In this case, advantageously, the signals originating from the sensor or sensors measuring the displacement of one or other of the actuators are conveyed to the two electronic command and control units assigned to each of the electrohydraulic circuits.

In another embodiment, the signals originating from the sensor or sensors measuring the displacement of one or other of the actuators are conveyed to the electronic command and control unit assigned to the electrohydraulic circuit operating with the displacement-control, said unit transmitting to the other unit a signal representative of the difference between the position instruction and the displacement measurement.

Therefore, depending on the case, the component applied to the second circuit and which is developed from the filtering of the position instruction may take account directly of the same displacement instruction as that which is used for the first circuit. But it is also possible that it is developed from a deviation signal used for the displacement control of the first circuit, that is to say indirectly from the displacement instruction, from which the effective displacement measurement has been subtracted.

A BRIEF DESCRIPTION OF THE DRAWINGS

The manner of embodying the invention and the advantages derived therefrom will clearly emerge from the following description of the embodiment in support of the appended figures, wherein.

the change in displacement of the rod of the cylinder acting on the turning angle for a ramp-like instruction;

the change in the displacements of the slides of the solenoid valves of the two circuits; the change in the forces measured in the two circuits.

Figure 4A:
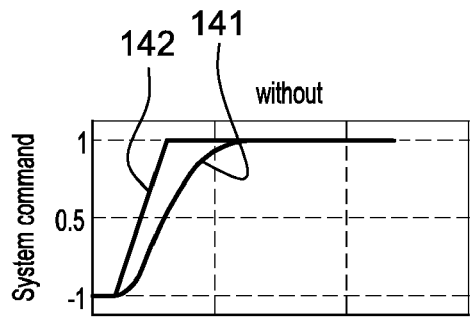
FIGS. 4a to 4c are timing charts illustrating in a standardized manner and for a system of the prior art corresponding to document WO 2004/09425, respectively.
Figure 5A:
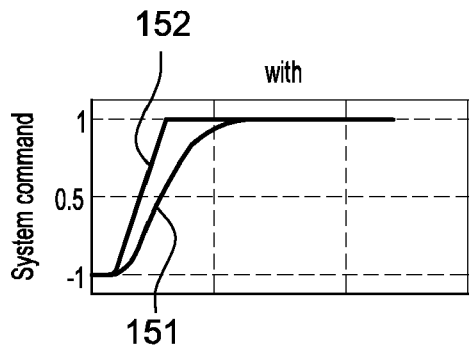
Figure 4B:
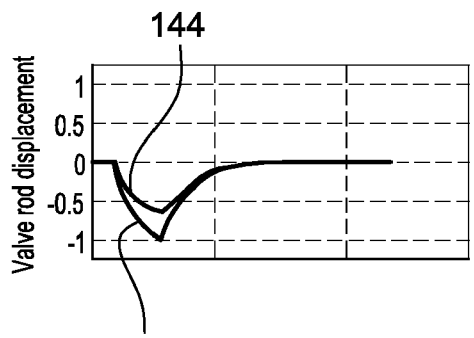
Figure 5B:
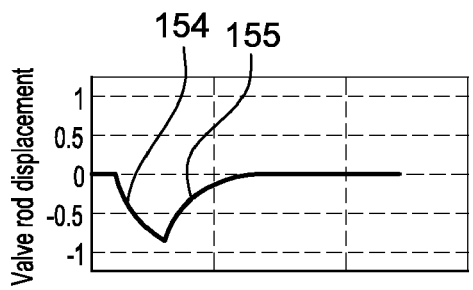
Figure 4C:
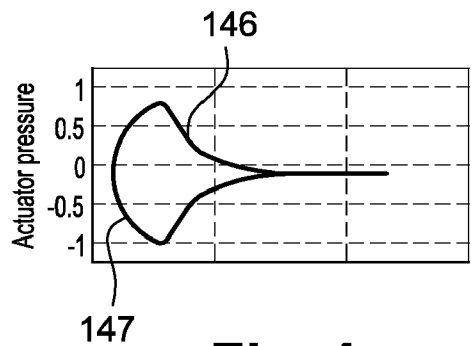
Figure 5C:
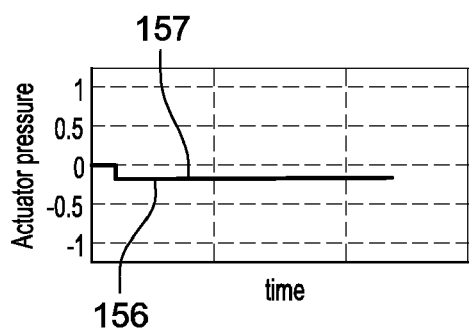

FIGS. 5a to 5c are timing charts similar to those of FIGS. 4a to 4c respectively for a system according to the invention.

DETAILED DESCRIPTION

Figure 1:
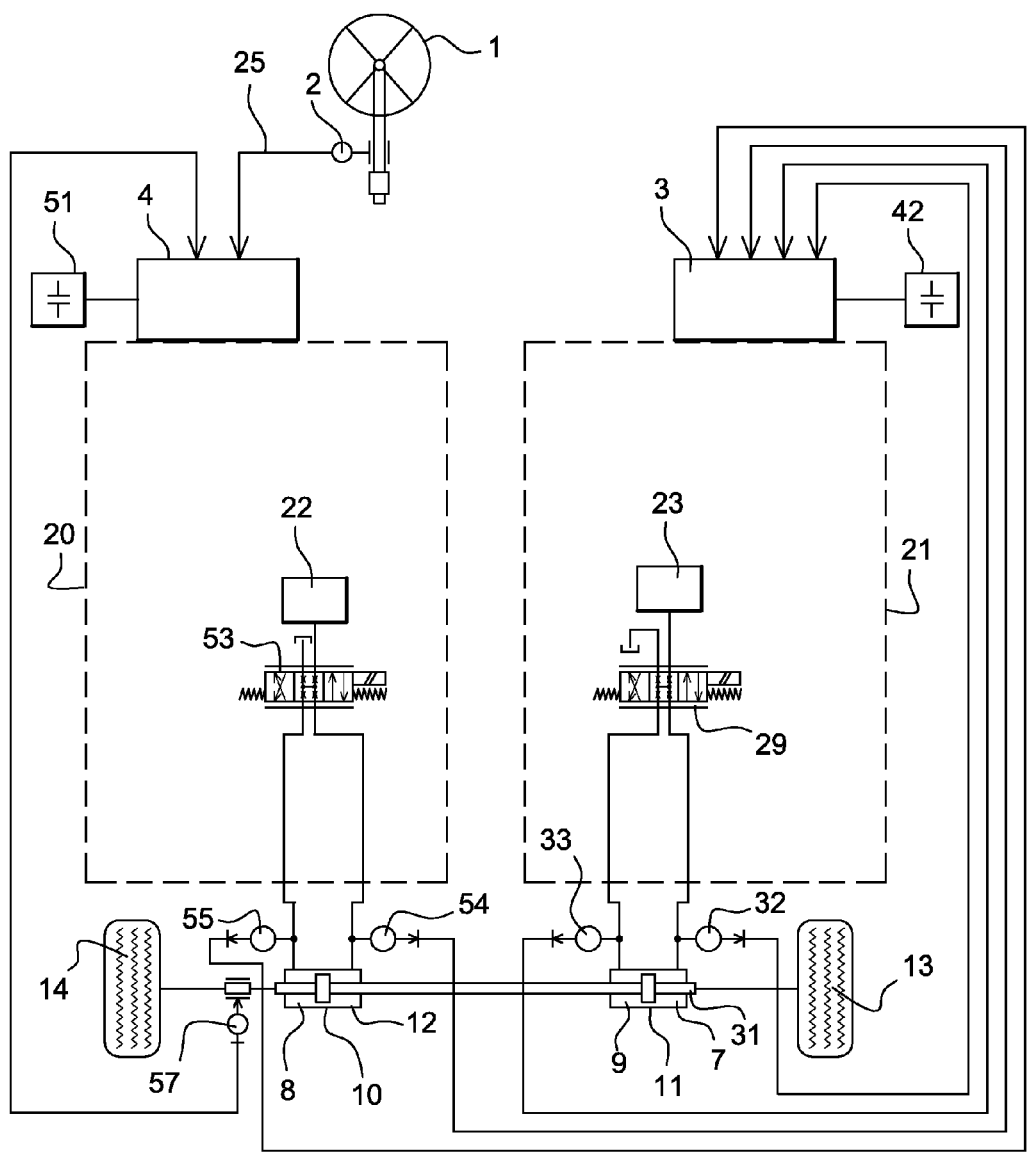
FIG. 1 is a diagram illustrating in a simplified manner the various elements involved in the operation of the system according to the invention.

The system illustrated in FIG. 1 is similar to that described in document WO 2004/09425. Therefore, in brief, such a steering system comprises a steering wheel 1 whose angle of rotation may be determined by a sensor 2 which delivers the corresponding information to electronic computers 3, 4 themselves acting on electrohydraulic circuits 20, 21 from one or more sources 22, 23 of pressurized fluid. More precisely, these two electrohydraulic circuits 20, 21 each include a proportional, closed-center solenoid valve 53, 29 which, depending on the control instructions applied thereto, delivers a quantity of fluid to an actuator 10, 11 of the cylinder type, acting on the turning angle of the wheels 13, 14. In practice, the two actuators are coupled to the extent that the cylinders form a single cylinder with four chambers 8, 12, 9, 7 acting on a single rod 31.

Appropriate mechanisms, which do not need to be described in detail, transmit the movement of this cylinder to the steering axle.

The control of the two electrohydraulic circuits 20, 21 is carried out by means of closed-loop controls taking account of the information originating from sensors interfaced with the actuators. More precisely, a displacement sensor 57 makes it possible to measure the displacement of the cylinder rod, and/or else of another element the position of which is directly linked to the displacement of this cylinder. This displacement measurement is used for the control of the first electrohydraulic circuit 20, which is therefore position-controlled.

Additionally, pressure sensors 55, 54, 33, 32 are installed on various ducts connected to each of the chambers 8, 12, 9, 7 of the actuators in order to evaluate the pressure level prevailing in these chambers, and therefore the level of stress exerted on the cylinder. These stress measurements make it possible to control the second hydraulic circuit 21 because it is not possible to control both circuits with respect to the same displacement variable, since they are mechanically coupled.

As already mentioned, the enhancement of the present invention relative to the system described in document WO 04/09425 consists in controlling the second electrohydraulic circuit 21 not only from a stress instruction, but also from an instruction originating from the position control of the other circuit.

Figure 2:
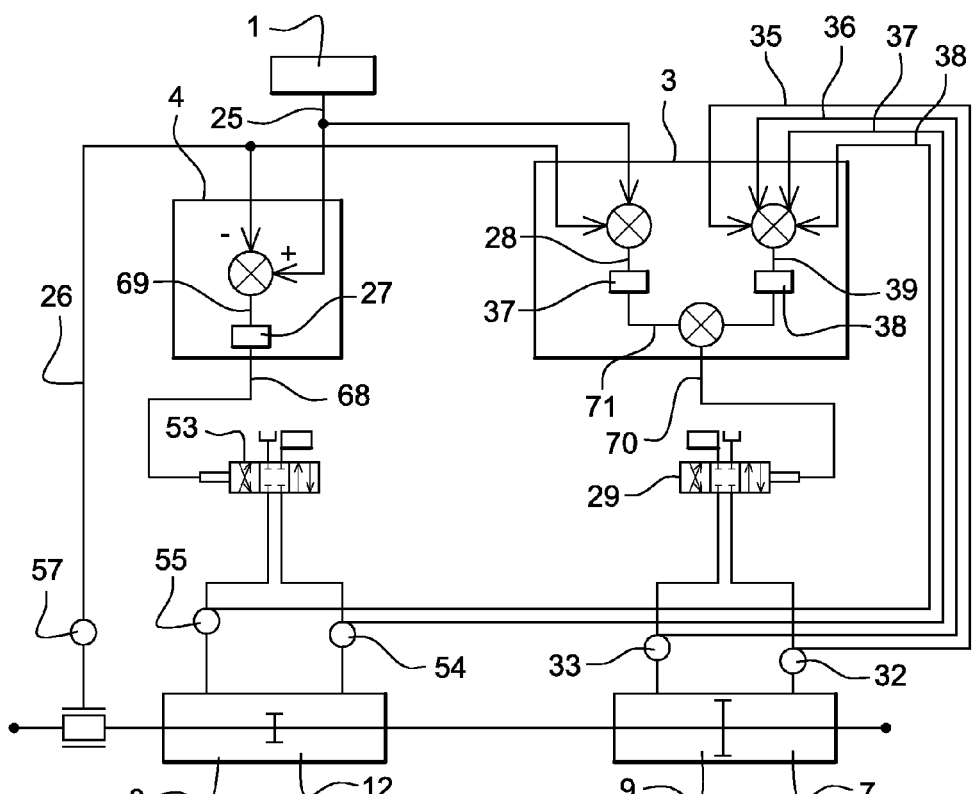
FIGS. 2 and 3 are diagrams derived from FIG. 1 showing two variant embodiments of the invention.

More precisely, and as illustrated in FIG. 2, the solenoid valve 53 of the first circuit is controlled by means of a computer, or an electronic command and control unit 4. Installed in this computer, in a software, hardware or combined manner, is a closed-loop control taking account of a position instruction 25 developed for example from the information representative of the rotation of the steering wheel 1. This position instruction may also originate from an assisted or automatic trajectory control system.

This position instruction 25 is compared with the displacement measurement 26 developed by the sensor 57 in order to give a deviation signal 69. The control signal 68 delivered to the solenoid valve 53 may result from various filtering of the PID type 27 or saturation, which may also be implemented in order to ensure a satisfactory control.

According to the invention, the command 70 for controlling the second electrohydraulic circuit 21 takes account not only of the information 39 relating to the stresses exerted in the various chambers 8, 12, 9, 7 of the cylinders, but also of a component 71 developed from the position instruction 25 also applied to the first circuit.

More precisely, a first component 39 of the control of the second circuit 21 takes account of all the information 35, 38 originating from the pressure sensors 32, 33, 54, 55 measuring the pressure prevailing in the various chambers of the actuators. The pressure values 37, 38 measured in the first actuator are taken into account in an additive manner, while the pressures 35, 36 of the second actuator are taken account of in a subtractive manner, so as to ensure the equality of the stresses produced in the two cylinders.

Figure 3:
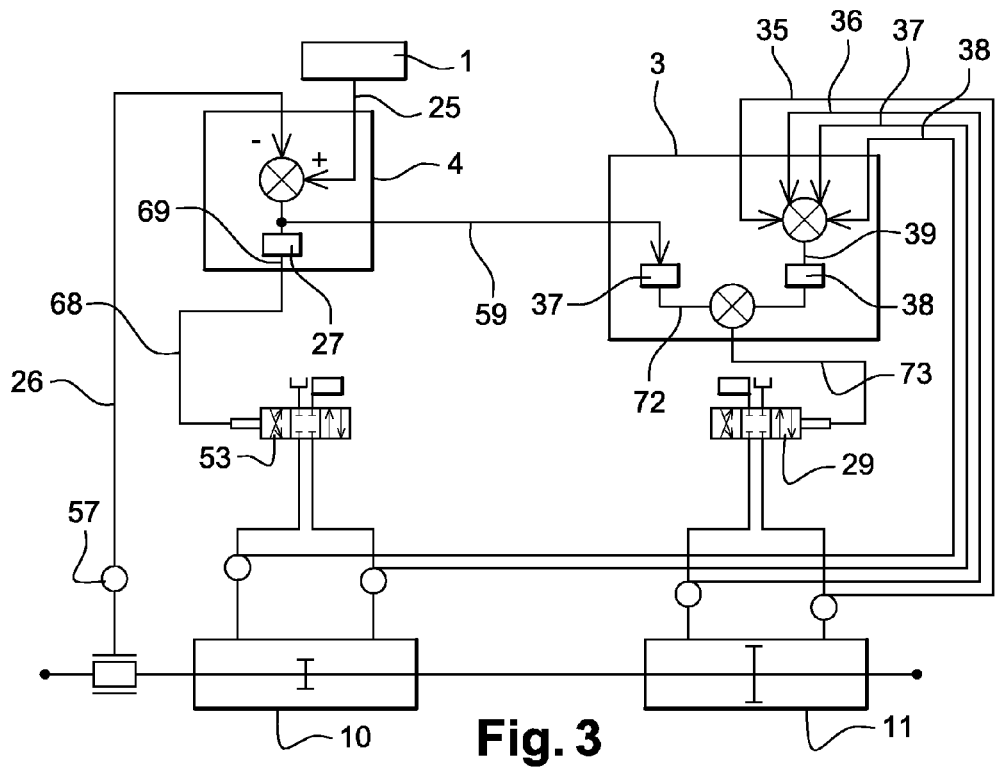

Additionally, this control takes account of a component 71 developed, in the form illustrated preferably after filtering 37, from the difference 28 between the position instruction 25 and the measurement 26 of the effective displacement originating from the displacement sensor 57. In the embodiment illustrated in FIG. 2, the electronic command and control unit 3 dedicated to the second circuit 21 processes this information directly. However, in the embodiment illustrated in FIG. 3, this information is processed only by the command and control unit 4 assigned to the first circuit 20, which therefore develops a position error signal 59, itself used by the command and control unit 3 assigned to the second circuit 21.

According to one feature of the invention, the frequency filtering actions may be carried out on both of the stress difference components 39 and the position difference component 28 used in the control of the second circuit 21. Therefore, the difference component 28 originating from the position control sustains a high-pass filtering 37 which makes it possible to inject into the control of the second circuit a component 71 relative to the dynamic portion of position control.

Additionally, the pressure information 39, representative of the stress used by the control of the second circuit 21, sustains a low-pass filtering 38, so as to prevent interference between the effects of these two components 28, 29 in a common frequency band. In this way, the rapid variations of the position instruction 25 are taken into account rapidly by the control of the second circuit, and more rapidly than with the dynamic imposed by the pressure increases of the chambers of the cylinders 8, 12, 9, 7 and the detection by the pressure sensors 54, 55, 32, 33.

The solenoid valve 29 of the second circuit 21 is therefore controlled more rapidly than if it was stress-controlled only. This anticipation makes it possible to prevent the situations in which the solenoid valve 53 of the first circuit 20 is open, but in which the fluid cannot circulate in the cylinder, since the solenoid valve 29 of the second circuit is still closed and therefore prevents any movement of the rod 31 of the cylinder.

In other words, the invention makes it possible to prevent the dynamic of the total system being imposed by the second circuit 21 which is the slowest to react.

In practice, the filtering 37, 38 carried out by the various components may be a filtering of the first or second order type with a determined cutoff frequency. It may also involve a more enhanced filtering of the Kalman or similar filtering type.

In practice, the cutoff frequency of this filtering may be determined according to the technology of the valves employed, and notably to the associated dynamic. Therefore, on the servovalve electrohydraulic control valves, the cutoff frequency may be of the order of a few tens of Hertz. This frequency may be lower in the use of direct electrically-controlled valves. In this case, a cutoff frequency of a few Hertz may be sufficient.

In practice, the advantages of the invention appear clearly when comparing the various signals representative of the operation of the invention with the same signals for solutions of the prior art. Hence, as illustrated in FIG. 5a, the change over time of the turning angle of the wheels, represented by the curve 151, in response to an instruction corresponding to a rotation of the steering wheel, represented by the curve 152. It is observed that these curves are very similar to those measured in the prior art, as illustrated in FIG. 4a. On the other hand, the displacement of the solenoid valve slides of the valves of the two circuits controlled are represented by two virtually indistinguishable curves (curves 154 and 155), which clearly shows that the control according to the invention makes it possible to obtain virtually identical behaviors for the solenoid valves of both circuits. Consequently, and as illustrated in FIG. 4c, the stress values (curves 156 and 157) evaluated for each circuit are identical, which indicates that the stress-controlled circuit supplies a stress equal to that developed by the displacement-controlled circuit, and is so from the beginning of the movement of the solenoid valve slides. The assistance of the first circuit by the second is therefore immediately effective, with no excess energy consumption.

The result of the foregoing is that the present invention has the advantage of allowing an optimized dynamic operation of the "Steer by Wire" steering systems comprising two coupled displacement-controlled and stress-controlled hydraulic circuits.

The invention claimed is:

1. A steering system controlling the turning angle of the steering wheels of a vehicle, comprising two electrohydraulic circuits each including an actuator, the two actuators being mechanically coupled and acting simultaneously on the turning angle of the wheels, a first circuit of the two circuits being displacement-controlled relative to a position instruction, the second circuit being stress-controlled, wherein the instruction applied to the second circuit comprises a component developed from a filtering of the position instruction.

2. The steering system as claimed in claim 1, wherein the component developed from a filtering of the position instruction is developed from a deviation signal used for the displacement control of the first circuit.

3. The steering system as claimed in claim 1, wherein the component developed from a filtering of the position instruction includes a high-pass filtering.

4. The steering system as claimed in claim 1, wherein the stress control of the second circuit includes a low-pass filtering of the measurement of stresses applied to the actuator or actuators.

5. The steering system as claimed in claim 1, wherein the hydraulic circuits comprise solenoid valves for controlling the actuators of the "closed-center" type.

6. The steering system as claimed in claim 1, wherein each electrohydraulic circuit is controlled by a specific electronic command and control unit.

7. The steering system as claimed in claim 1, wherein the position instruction is developed from a control member of the steering on which the driver acts.

8. The steering system as claimed in claim 1, wherein it comprises at least one sensor measuring the displacement of one or the other of the actuators.

9. The steering system as claimed in claim 1, wherein it comprises several sensors measuring the pressures prevailing in the chambers of the actuators.

10. The steering system as claimed in claim 6, wherein the position instruction is transmitted to the electronic command and control units each assigned to one electrohydraulic circuit.

11. The steering system as claimed in claim 6, wherein the steering system comprises at least one sensor measuring the displacement of one or the other of the actuators and the signals originating from the sensor or sensors measuring the displacement of one or other of the actuators are conveyed to the two electronic command and control units each assigned to electrohydraulic circuits.

12. The steering system as claimed in claim 6, wherein the steering system comprises at least one sensor measuring the displacement of one or the other of the actuators and the signals originating from the sensor or sensors measuring the displacement of one or other of the actuators are conveyed to the electronic command and control unit assigned to the electrohydraulic circuit operating with the displacement-control, the unit transmitting to the other unit a signal representative of the difference between the position instruction and the displacement measurement.

* * * * *